(12) United States Patent
Oh (10) Patent No.: US 7,661,643 B2
(45) Date of Patent: Feb. 16, 2010

(54) SWIVEL MOUNT SYSTEM FOR A MONITOR

(75) Inventor: Sung I. Oh, West Covina, CA (US)

(73) Assignee: CLO Systems, City of Industry ( * ) Notice: Subject to any disclaimer, the term of this patent is extended or adjusted under 35 U.S.C. 154(b) by 0 days.

(21) Appl. No.: 12/360,859

(22) Filed: Jan. 28, 2009

(65) Prior Publication Data

US 2009/0194656 A1 Aug. 6, 2009

Related U.S. Application Data

(60) Provisional application No. 61/025,844, filed on Feb. 4, 2008, provisional application No. 61/029,346, filed on Feb. 17, 2008.

(51) Int. Cl.
*A47F 5/00* (2006.01)

(52) U.S. Cl. .................................. 248/289.11; 248/919

(58) Field of Classification Search ............ 248/289.11, 248/282.1, 274.1, 917, 919; 361/679.02
See application file for complete search history.

(56) References Cited

U.S. PATENT DOCUMENTS

| | | | |
|---|---|---|---|
| 7,487,943 B1 * | 2/2009 | Gillespie | 248/282.1 |
| 2004/0035995 A1 * | 2/2004 | Chen et al. | 248/282.1 |
| 2006/0243872 A1 * | 11/2006 | Benzi | 248/282.1 |
| 2007/0252060 A1 * | 11/2007 | McPherson | 248/282.1 |
| 2008/0258029 A1 * | 10/2008 | Zhang | 248/284.1 |
| 2009/0212184 A1 * | 8/2009 | Bourgeois et al. | 248/288.11 |

* cited by examiner

*Primary Examiner*—Ramon O Ramirez (57) ABSTRACT

A mount system supports a monitor against a supporting surface such as a wall. The mount system allows the monitor to swing open adjacent to one of its edge and extends the monitor away from the wall so that the edge of the monitor does not hit the wall. A motor or a linear actuator may be used to move the monitor through a motorized action.

10 Claims, 13 Drawing Sheets

SWIVEL MOUNT SYSTEM FOR A MONITOR

RELATED APPLICATIONS

This application claims priority to two provisional application Ser. Nos. (1) 61/025,844, filed Feb. 4, 2008; and (2) 61/029,346, filed Feb. 17, 2008, which are both hereby incorporated by references.

BACKGROUND OF THE INVENTION

1. Field of the Invention

This invention is directed to a mounting system that is adapted to couple to a back side of a monitor and swing the monitor near one its side.

2. Background of the Invention

Flat panel monitors such as computer monitors, LCD, plasma, slim televisions, and the like (collectively referred to as "monitor(s)") are becoming popular because they can be mounted onto a wall to save floor space and for their aesthetically pleasing appearance. In many applications, the monitor is placed on a table, mounted to a wall, or even hanging from a ceiling. In these applications, however, in order to reposition the monitor, the viewer needs to walk over to the monitor and physically move the monitor to a new viewing angle.

Motorized swinging mounts are now available that are designed to swing the monitor on its side muck like a door that swings from one of its sides attached to hinges. These motorized swinging mounts are provided with a pivot point that swings opens and closes through motorized action. The motorized swinging mounts are designed so that its pivot points are design to be juxtaposed on the outer edge of the monitor so that the monitor can swing open 90 degrees. Such motorized swinging mounts, however, have a number of limitations. First, with the pivot point on the back side and located on the out side edge of the monitor, much of the motorized swinging arm is exposed so that it is esthetically unpleasing. Second, in many applications, it may be desirable to install the motorized mount or the combination of the monitor and the motorized mount into a recessed wall. Such recessed installation, however, minimizes the gap between monitor and the wall so that the motorized swinging arm is prevented from swinging the monitor to the fully open position or 90 degrees. Accordingly, there is a need for a mount that can swing open a monitor from one of its side without being exposed from the side of the monitor.

INVENTION SUMMARY

This invention is directed to a mount system adapted to support a monitor against a supporting surface such as a wall. The mount system includes a support bracket adapted to couple to a supporting surface. One or more monitor brackets may be provided, each having a proximal end and a distal end. At least two arms may be provided between the support bracket and the monitor brackets. The at least two arms includes a first arm having a proximal end and a distal end. The proximal end of the first arm may be pivotably coupled to the support bracket about a first pivot axis, and the distal end of the first arm may be pivotably coupled adjacent to the proximal end of the monitor bracket about a second pivot axis.

The mount system may include a second arm having a proximal end and a distal end. The proximal end of the second arm may be pivotably coupled to the support bracket about a third pivot axis, and the distal end of the second arm may be pivotably coupled adjacent to the proximal end of the monitor bracket about a fourth pivot axis. Such pivot axes allows the monitor bracket to move between a retracted position and an extended position relative to the supporting bracket.

The locations of the first, second, third, and fourth pivot axes may be defined in reference to a XZ coordinates. To allow the monitor bracket to swing open and extend away from the supporting bracket, the first, second, third, and fourth pivot axis may be defined as the following. The distance between the first and second pivot axes may be longer than the distance between the third and fourth pivot axes. The third pivot axis may be farther along the X-axis than the first pivot axis. In the retracted position, the second pivot axis may be farther along the X-axis than the first pivot axis; the fourth pivot axis may be farther along the X-axis than the third pivot axis, and the fourth pivot axis may be farther along the X-axis than the second pivot axis.

With the monitor bracket swing opening and extending away from the support bracket, the mount system may be located behind and inside of the edge of the monitor because the side of the monitor does not run into the wall. This allows the mount bracket to be hidden so that it is less noticeable.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
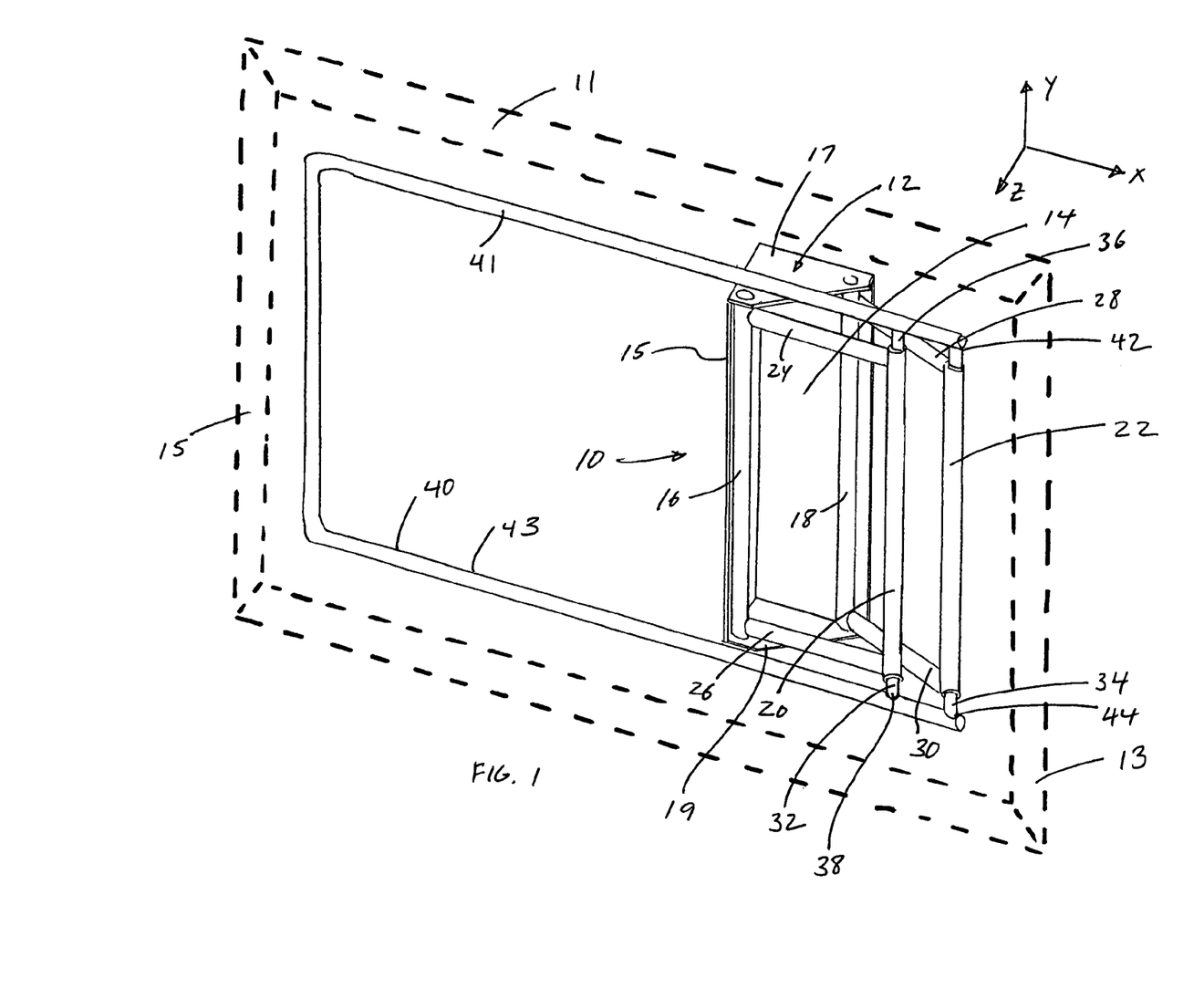
FIG. 1 shows a perspective view of a mount system in reference to X, Y, and Z coordinates adapted to swivel a monitor.

FIG. 1 shows a perspective view of a mount system 10 in reference to X, Y, and Z coordinates adapted to swivel a monitor 11 (shown in dotted lines) about its right side 13 (when facing the monitor). The mount system includes a chamber 12 having a rear surface 14 adapted to couple to a support surface such as a wall. The chamber 12 may have an adjacent side wall 15; and first and second end plates 17 and 19. The chamber 12 may also support a first post 16 and a second post 18 between the first and second end plates 17 and 19 such that the two posts may rotate about their respective longitudinal axes or Y-axis. The second post 18 may be closer to the rear surface 14 than the first post 16; and the first post 16 may be closer to the adjacent side wall 15 than the second post 18. The mount system 10 may include a third post 20 and a fourth post 22. The first post 16 may be coupled to the third post 20 via arms 24 and 26; and the second post 18 may be coupled to the fourth post 22 via arms 28 and 30. The first, second, third, and fourth posts may be substantially parallel with respect to each other.

The third post 20 may be adapted to receive a first shaft 32; and the fourth post 22 may be adapted to receive a second shaft 34 such that the first and second shafts 32 and 34 may rotate about their respective longitudinal axes or Y-axis. The first shaft 32 may have a first end 36 and a second end 38, which are coupled to a monitor bracket 40. The monitor bracket 40 may have a U-shape with two parallel portions 41 and 43 substantially along the X-axis. The second shaft 34 may have a first end 42 and a second end 44, which are coupled to the monitor bracket 40. A variety of monitor mounting brackets known to one skilled in the art may be used to attach the back side of the monitor 11 to the two portions 41 and 43 of the monitor bracket 40.

Figure 2:
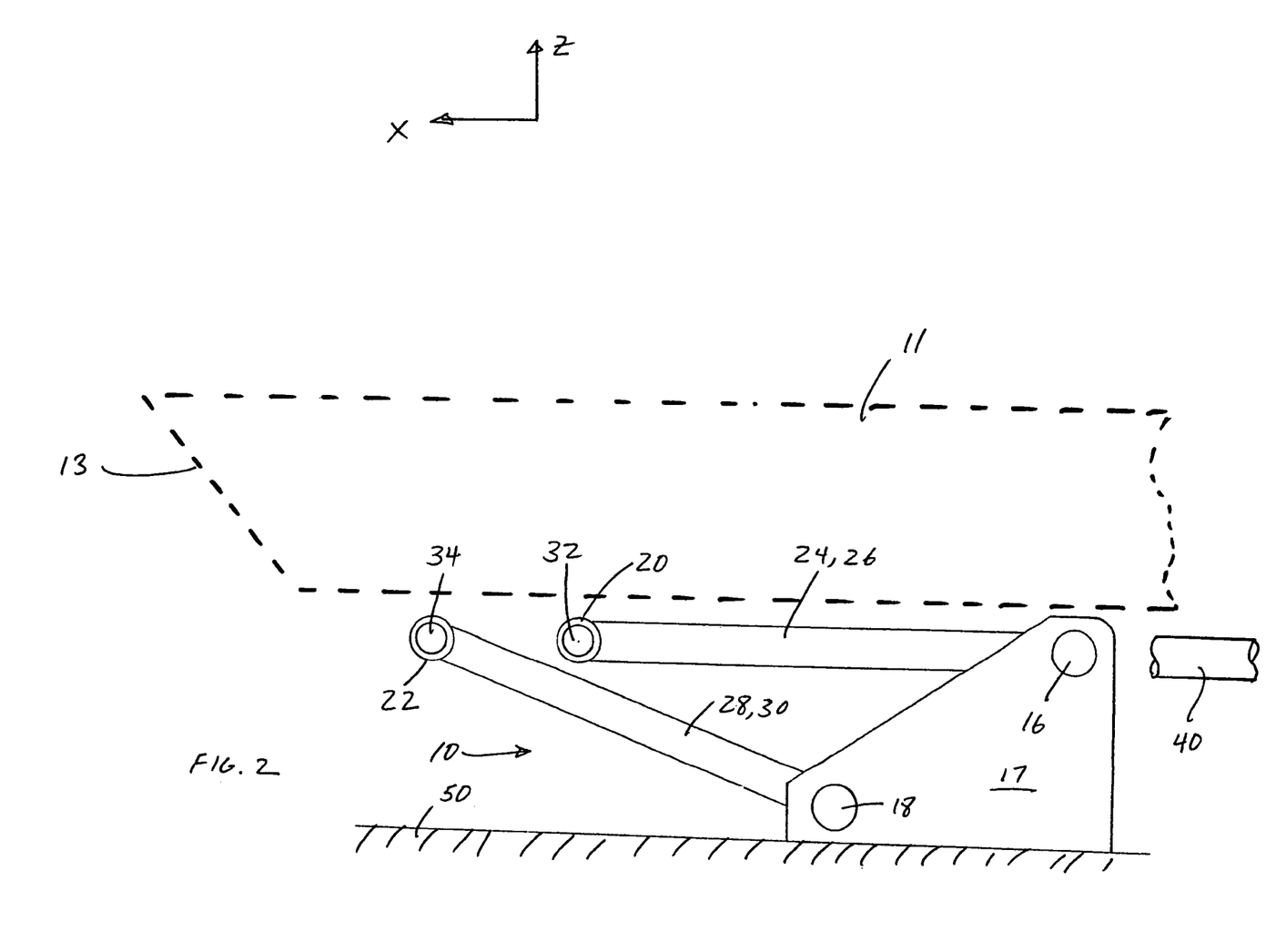
FIG. 2 shows a top view of the mount system of FIG. 1.
Figure 3:
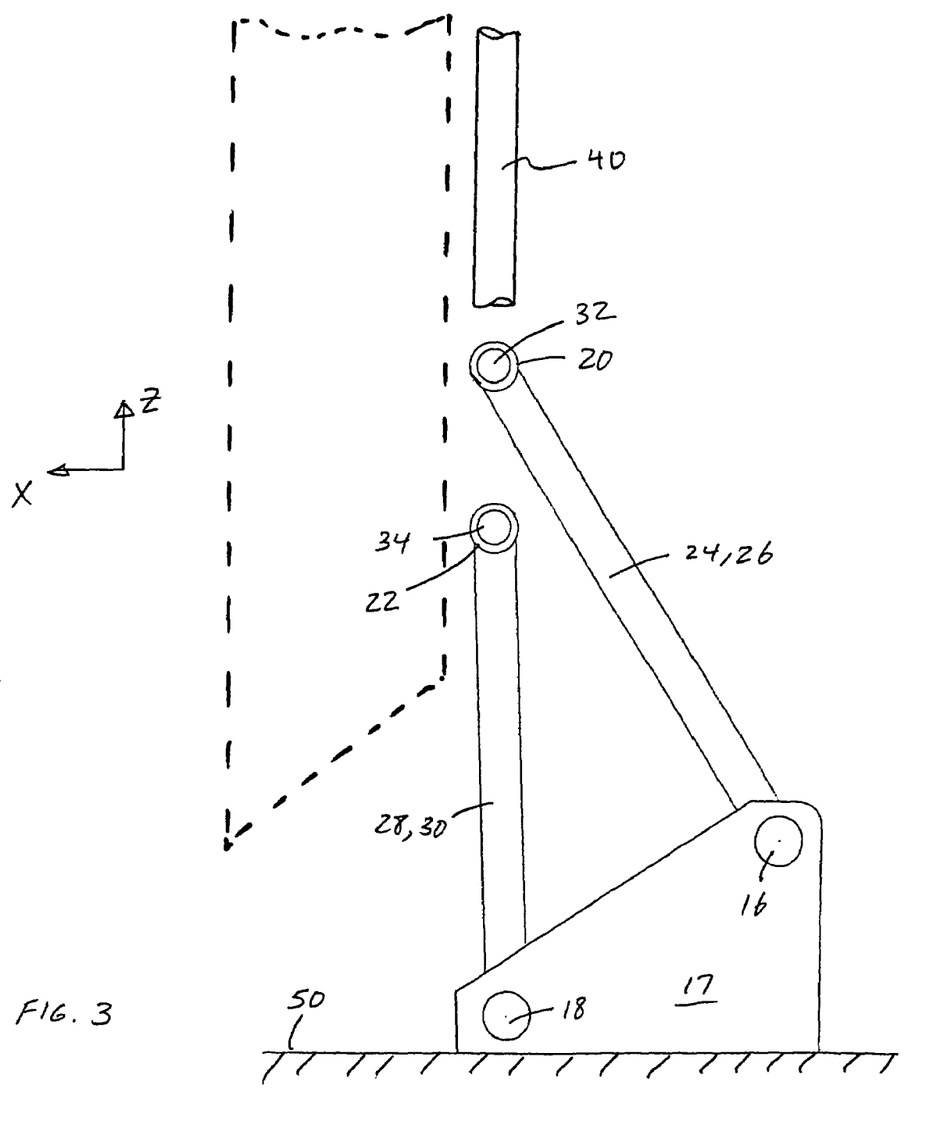
FIG. 3 shows the mount system of FIG. 1 in an extended position relative to a wall.

FIG. 2 shows a top view of the mount system 10 with a portion of the monitor bracket 40, and the right portion 13 of the monitor 11. Note that the monitor bracket 40 may be coupled to the shafts 32 and 34 so that the longitudinal axis of the monitor bracket may be substantially along the line defined by the two posts 20 and 22. FIG. 2 shows the mount system 10 in a retracted position relative to the wall 50; and FIG. 3 shows the mount system in an extended position relative to the wall 50. With the monitor bracket coupling the two posts 20 and 22, the distance between the two posts 20 and 22 is substantially maintained between the retracted and extended positions.

As one example, the first, second, third, and fourth posts 16, 18, 20, and 22 may be arranged so that in the retracted position, the first, third, and fourth posts 16, 20, and 22 are substantially along the X-axis or substantially parallel with the wall 50; and in the extended position, the second, third, and fourth posts 18, 20, and 22 are substantially along the Z-axis. As a user pulls on the left side 15 of the monitor 11, the third and fourth posts 20 and 22 rotate in the clockwise directions relative to their respective posts 16 and 18 such that the right side 13 of the monitor 11 moves away from the wall 50. This movement allows the mount system 10 to be attached behind the monitor 11 so that the mount system 11 is not exposed in the retracted position.

Figure 4:
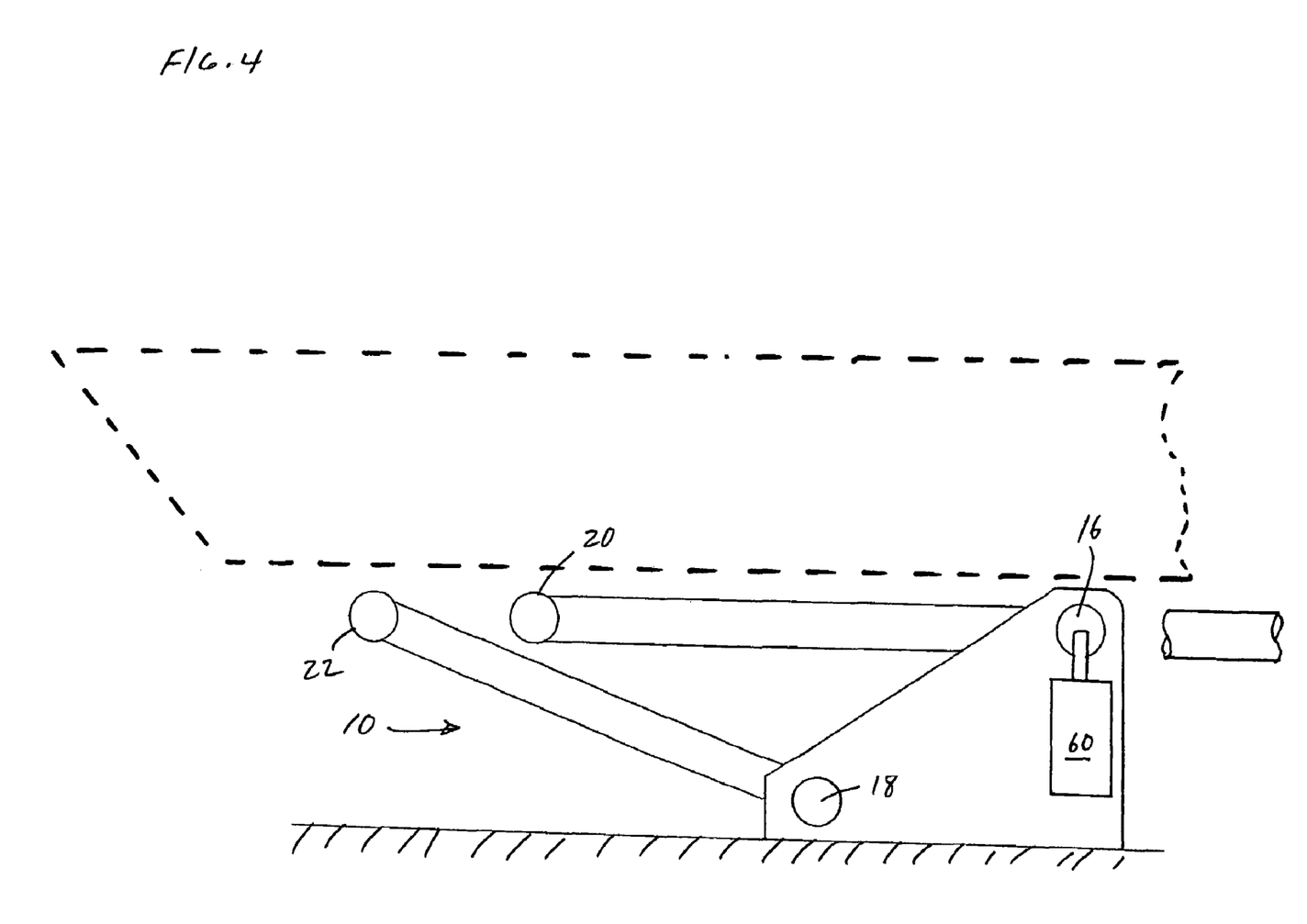
FIG. 4 shows a mount system having a motor to move a monitor through motorized action.

FIG. 4 shows that the mount system 10 may include a motor 60 mechanically coupled to the first post 16 to move the mount system 10 between the retracted position and the extended position through a motorized action. For instance, the motor 60 may rotate the first post 16 about a clockwise direction to extend the mount system and vice versa. Alternatively, the motor 60 may be mechanically coupled to any one of the other posts such as the second, third or fourth post to move the mount system 10 between the retracted position and the extended position through a motorized action. Yet another alternative is to mechanically couple the motor to one of the shafts 32 or 34.

Figure 5:
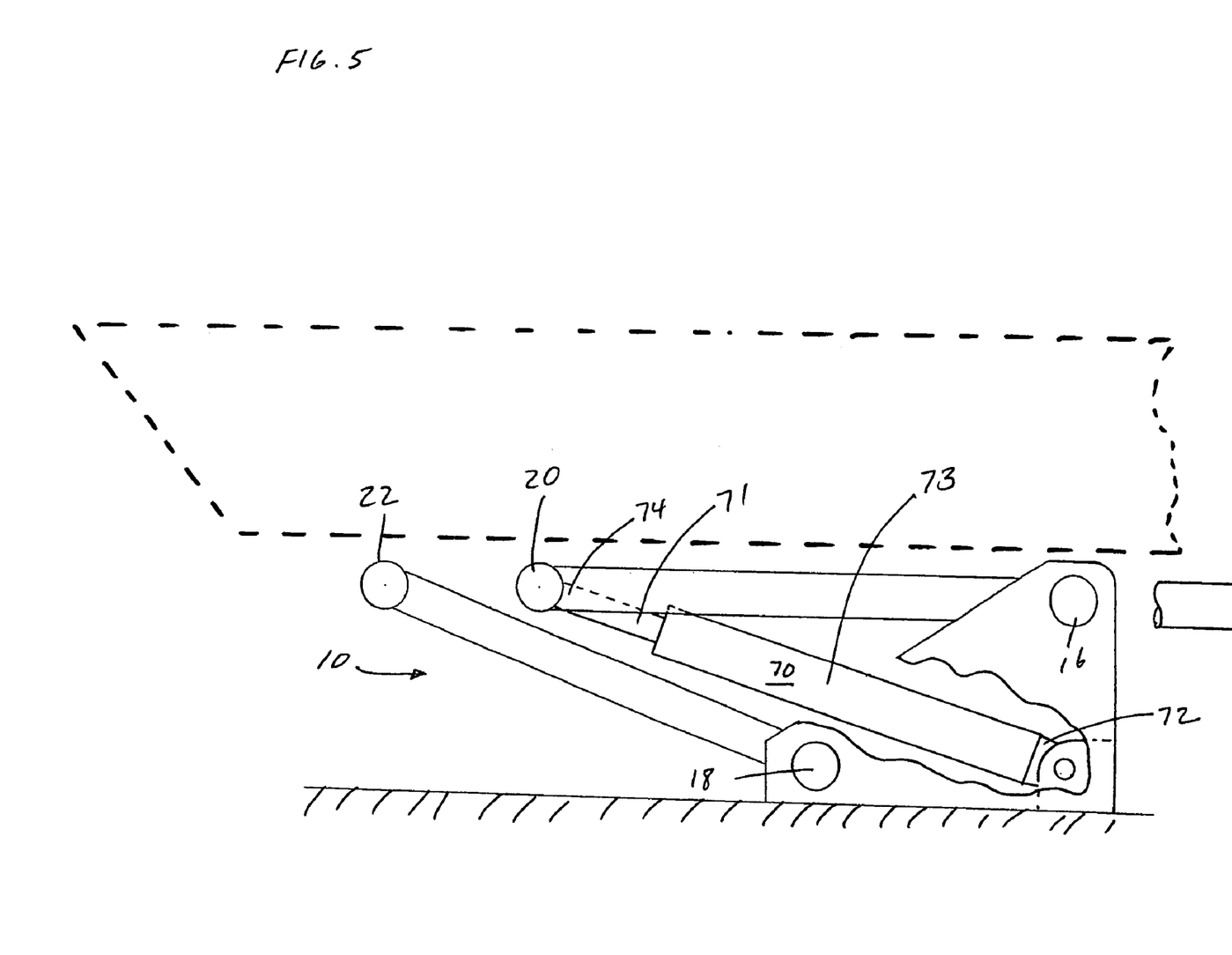
FIG. 5 shows a mount system having an actuator to move a monitor through motorized action.

FIG. 5 shows that the mount system 10 may include an actuator 70 to move the mount system 10 between the retracted position and the extended position through a motorized action. The actuator may be by linear type that has a piston 71 that extends and retracts relative to the housing 73. The actuator 70 may have a proximal end 72 and a distal end 74. The proximal end 72 may be pivotably coupled to the chamber 12 and the distal end 74 may be pivotably coupled to the third post 20. It is within the scope of this invention to use a variety of different type of actuator such as a jack type motorized actuator.

Figure 6:
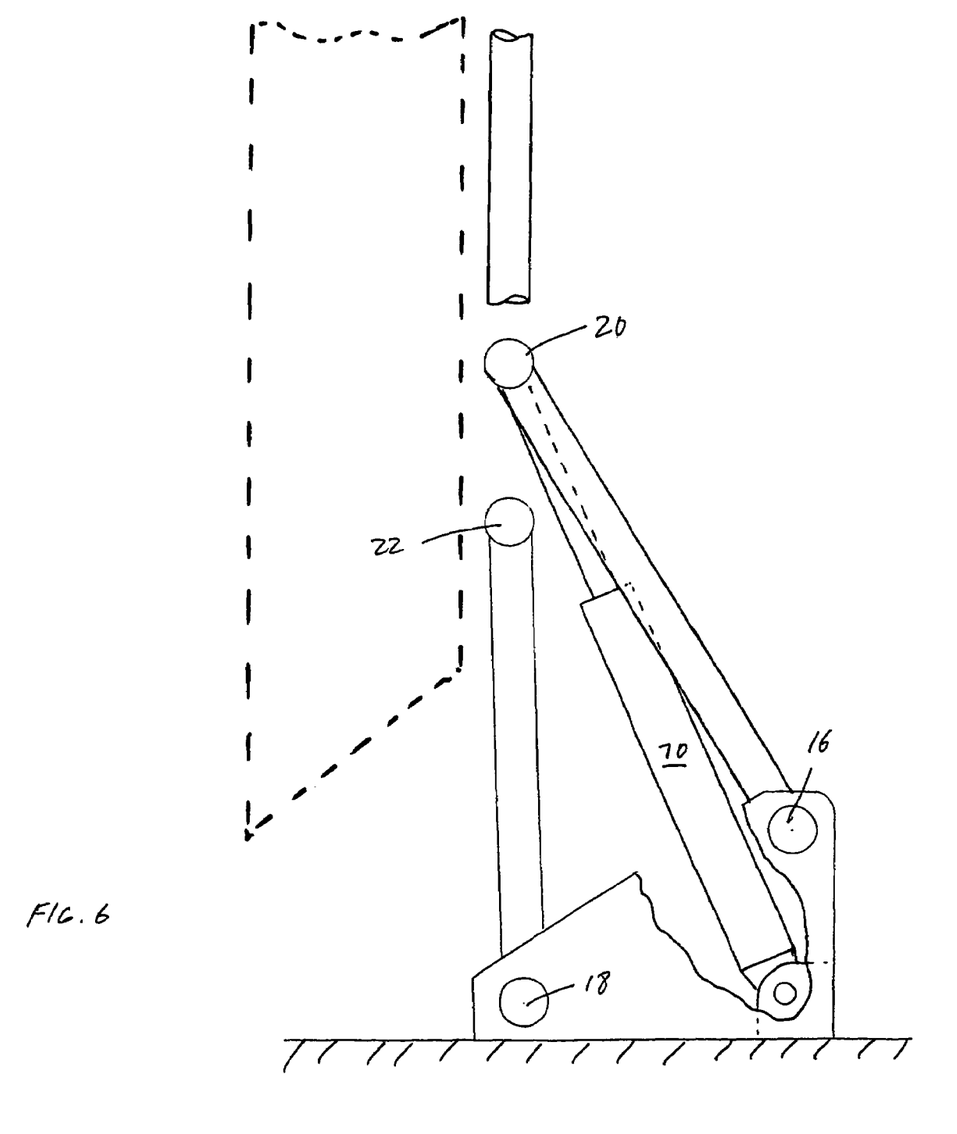
FIG. 6 shows a mount system of FIG. 5 in an extended position by extending the actuator.

FIG. 5 shows the actuator 10 in a retracted position, which in turn causes the mount system 10 to be in the retracted position. FIG. 6 shows that as the actuator 70 extends, the third post 20 extends as well causing the mount system to extend. Alternatively, the distal end 74 of the actuator 70 may be pivotably coupled to the fourth post 22 such that when the actuator 70 is in an extended position, the mount system is in the retracted position, and vice versa.

Figure 7:
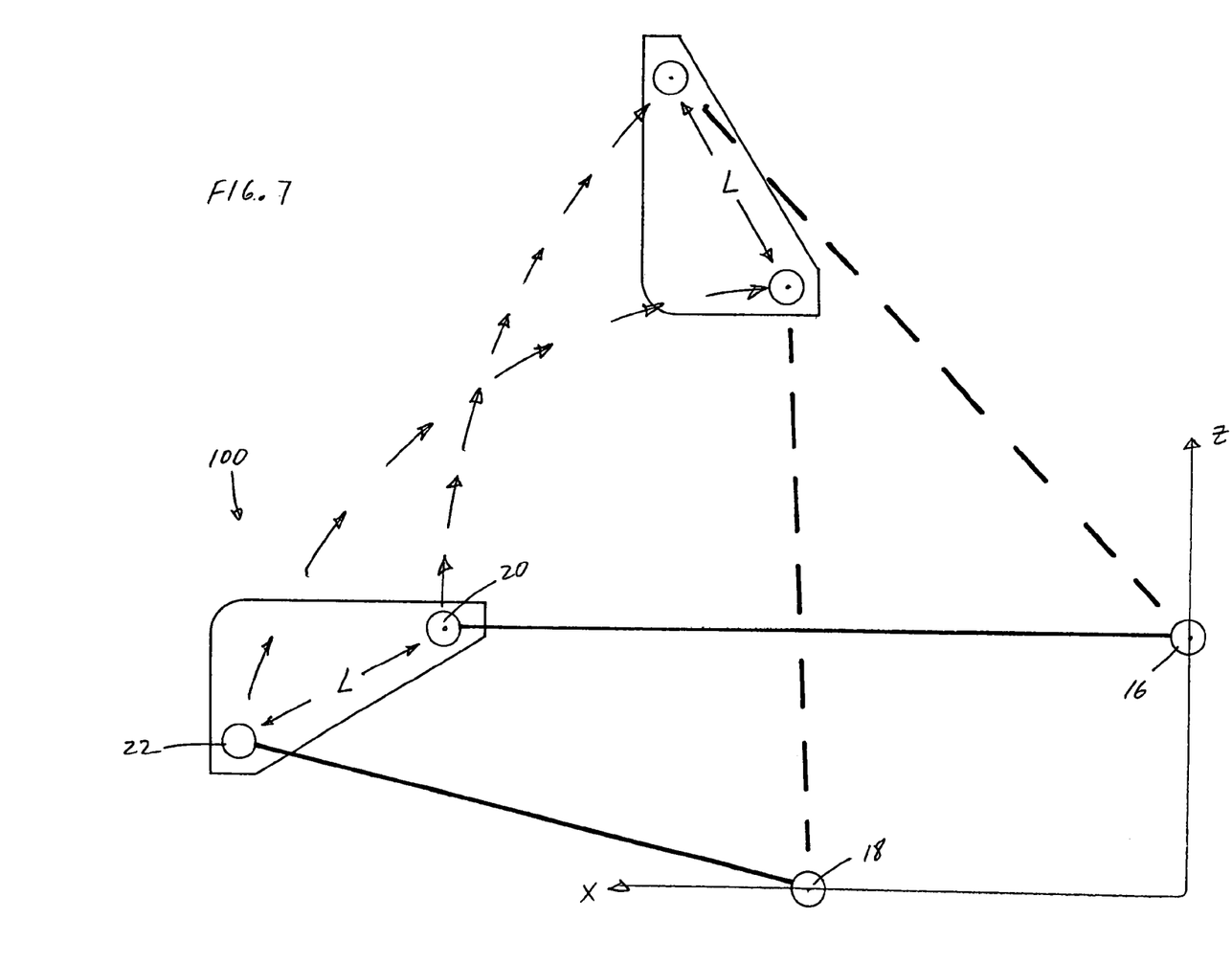
FIG. 7 shows another mount system moving from a retracted position to an extended position as indicated by the direction arrows.

FIG. 7 shows a mount system 100 moving from the retracted position to the extending position as indicated by the direction arrows. The mount system 100 illustrates that the first, second, third, and fourth posts 16, 18, 20, and 22 may be arranged in a different manner relative to the mount system 10. For instance, in the retracted position, the fourth post 22 may not be aligned with the first and third posts 16 and 20; and conversely, in the extended position, the fourth post 22 may not be aligned with the first and third posts 16 and 20, in comparison to the mount system 10.

Figure 8:
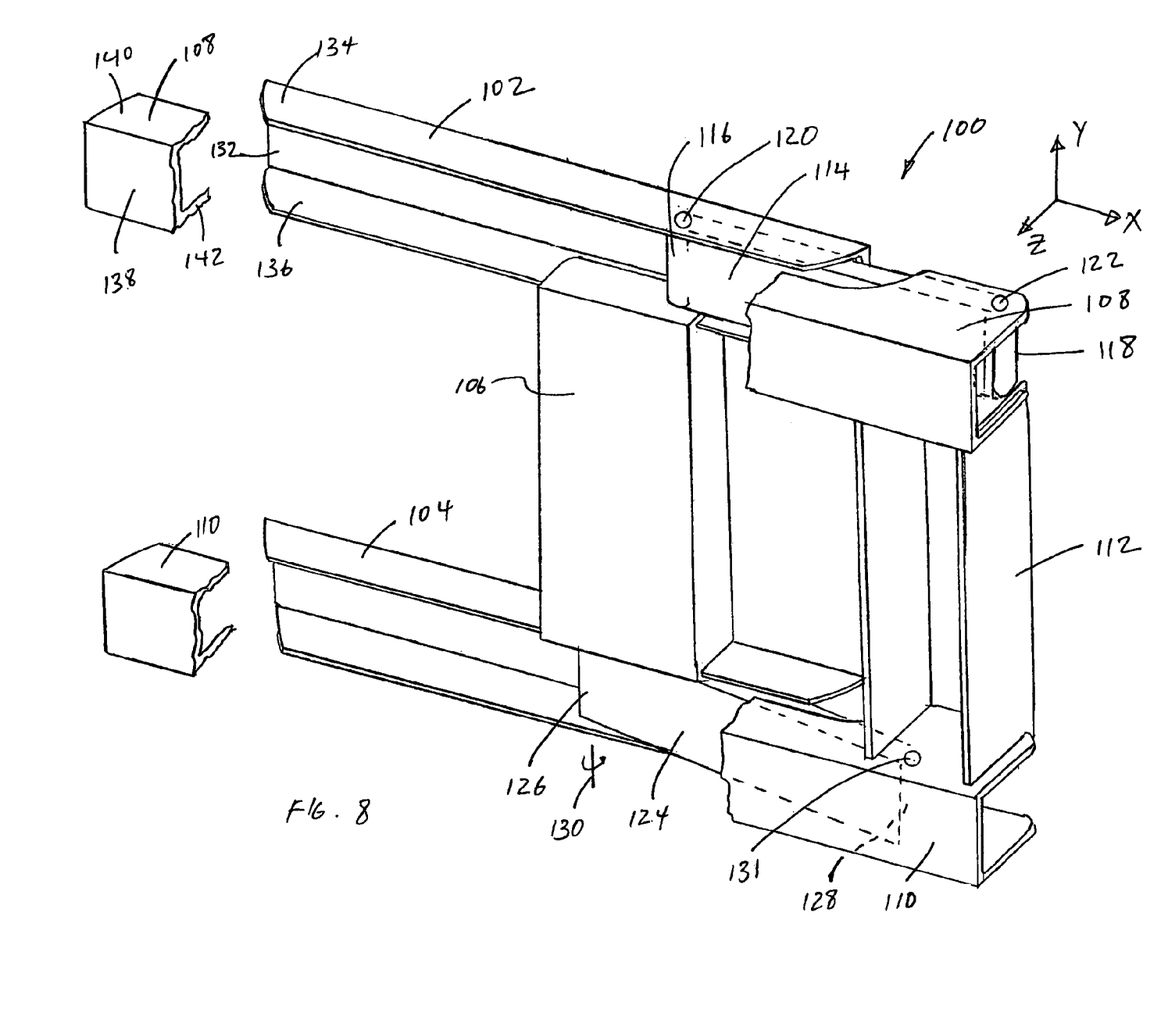
FIG. 8 shows a perspective view of yet another mount system.

FIG. 8 shows a perspective view of another mount system 100 in reference to X, Y, and Z coordinates. The mount system 100 includes a first support bracket 102 and a second support bracket 104. A third support bracket 106 may be provided between the first and second support brackets 102 and 104 to couple to the two support brackets together. The first and second support brackets 102 and 104 may have a C-shape configuration. The first and second support brackets 102 and 104 may be adapted to directly or indirectly couple to a supporting surface such as a wall. Each of the support brackets 102 and 104 may have a base 132 between the two side flanges 134 and 136. The dimensions of the two support brackets 102 and 104 may be substantially similar to each other.

The mount system 100 may include a first monitor bracket 108 and a second monitor bracket 110. A third monitor bracket 112 may be provided between the first and second monitor brackets 108 and 110 to couple to the two monitor brackets together. The first and second monitor brackets 108 and 110 may have a C-shape configuration. The first and second monitor brackets 102 and 104 may be adapted to directly and indirectly couple to the back side of a monitor. Each of the monitor brackets 108 and 110 may have a base 138 between the two side flanges 140 and 142. The dimensions of the two monitor brackets 108 and 110 may be substantially similar to each other.

The mount system 100 may include a first arm 114 having a proximal end 116 and a distal end 118. The proximal end 116 may be pivotably coupled to the first support bracket 102 about a first pivot axis 120, which is substantially aligned with the Y-axis. The proximal end 116 may be sized to fit between the two side walls 134 and 136 and rotate about the pivot axis 120. The distal end 118 may be pivotably coupled to the first monitor bracket 108 about a second pivot axis 122, which is substantially aligned with the Y-axis. The distal end 118 may be sized to fit between the two side walls 140 and 142 and rotate about the pivot axis 122.

The mount system 100 may include a second arm 124 having a proximal end 126 and a distal end 128 (shown in dotted line in FIG. 8). The proximal end 126 may be pivotably coupled to the second support bracket 104 about a third pivot axis 130, which is substantially aligned with the Y-axis. The distal end 128 may be pivotably coupled to the second monitor bracket 104 about a fourth pivot axis 131, which is substantially aligned with the Y-axis. The first and distal ends 126 and 128 of the second arm 124 may be pivotably coupled to the support bracket 104 and the second monitor bracket 110, respectively, in a similar manner as the first arm 114. Accordingly, each of the first and second arms 114 and 124 may substantially support the weight of the monitor. As described in more detail below, the two arms 114 and 124 with their respective pivot axes separated by a predetermined distance along the Y-axis work together to rotate the monitor between a retracted position and an extended position substantially along the XZ plane.

In FIG. 8, a portion of the monitor brackets 108 and 110 have been removed to better show the first and second arms 114 and 124. FIG. 8 also shows the mount system 100 in a retracted position where the first and second monitor brackets 108 and 110 may be substantially parallel with the first and second support brackets 102 and 104.

Figure 9:
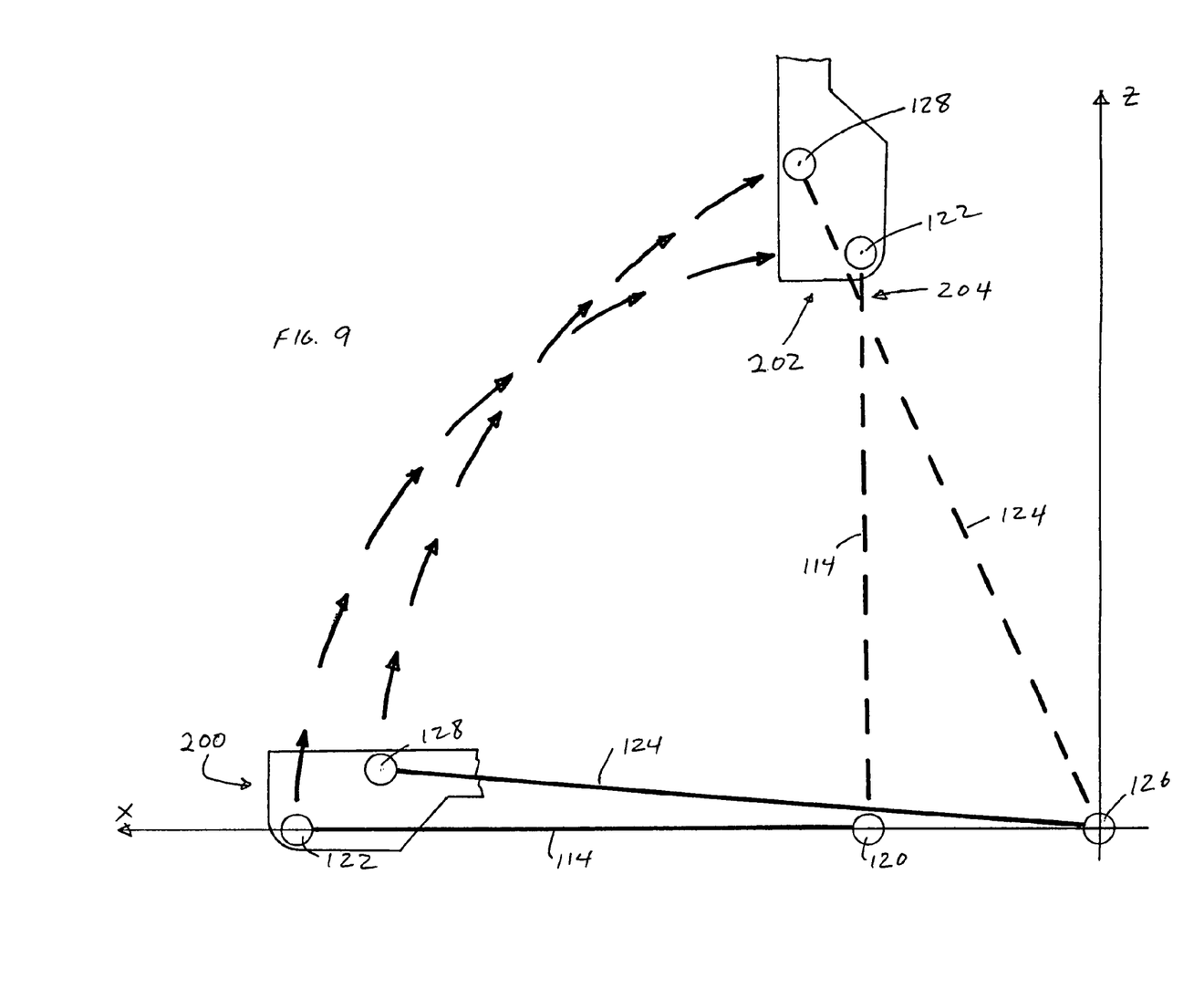
FIG. 9 shows a schematic diagram of the mount system of FIG. 8.

FIG. 9 shows one example of the relative positions of the pivot axes 120, 122, 126, and 128 along the XZ plane, and their respective movements between a retracted position 200 (represented in solid lines) and an extended position 202 (represented in dotted lines). The pivot axes 120 and 126 of the first and second arms 114 and 124, respectively, may be substantially along the X-axis to minimize the depth (distance along the Z-axis) of the first and second support bracket 102 and 104. In the retracted position, the pivot axes 120 and 122 may be substantially along the X-axis as well to minimize the depth of the mount system 100. The pivot axis 128 may be in the positive (+) Z-axis direction and negative (−) X-axis direction relative to the pivot axis 122. The distance between the pivot axes 122 and 128 in the Z-axis gives the two arms 114 and 124 improved leverage, in comparison to the two pivot axes 122 and 128 along the X-axis, to resist the weight of the monitor from leaning the monitor forward in the retracted position. The distance between the pivot axes 122 and 128 in the X-axis gives the two arms 114 and 124 leverage to resist the weight of the monitor from twisting the monitor in a counter-clock wise direction when facing the monitor in the retracted position.

FIG. 9 shows that with the two arms 114 and 124 separated along the Y-axis, the two arms 114 and 124 may cross each other without interference. For instance, in the extended position, the two arms 114 and 124 cross each other at a location 204 in the XZ plane. This allows for greater design flexibility and greater range of movement between the retracted position and the extended position. Moreover, with the two arms 114 and 124 separated in along the Y-axis, video and audio cables and the power cord for the monitor may be passed through the space between the two arms 114 and 124 so that the cables and power cords do not interfere with the movement of the mount system between the retracted and extended positions. In addition, a linear actuator may be provided in the space between the two arms 114 and 124 so that the linear actuator does not interfere with the movement of the two arms. As such, having the two arms 114 an 124 separated at a predetermined distance along the Y-axis provides design flexibility and greater range of movement.

Figure 10:
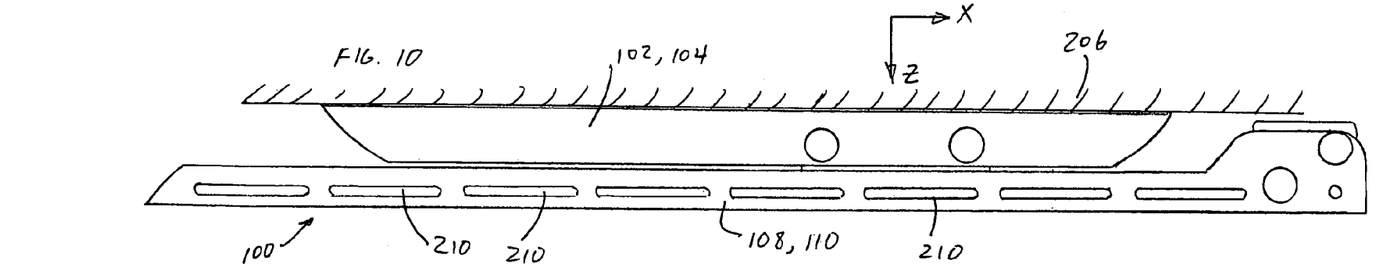
FIG. 10 shows a top view of the mount system of FIG. 8.

FIG. 10 shows the mount system 100 in a retracted position along the XZ coordinates. In the retracted position, the monitor brackets 108 and 110 may be substantially parallel with the support brackets 102 and 104, which may be anchored to the wall 206. The monitor brackets 108 and 110 may have a plurality of elongated openings 210 adapted to receive a bolt to attach the monitor to the monitor brackets 108 and 110, as discussed in more detail below.

Figure 11:
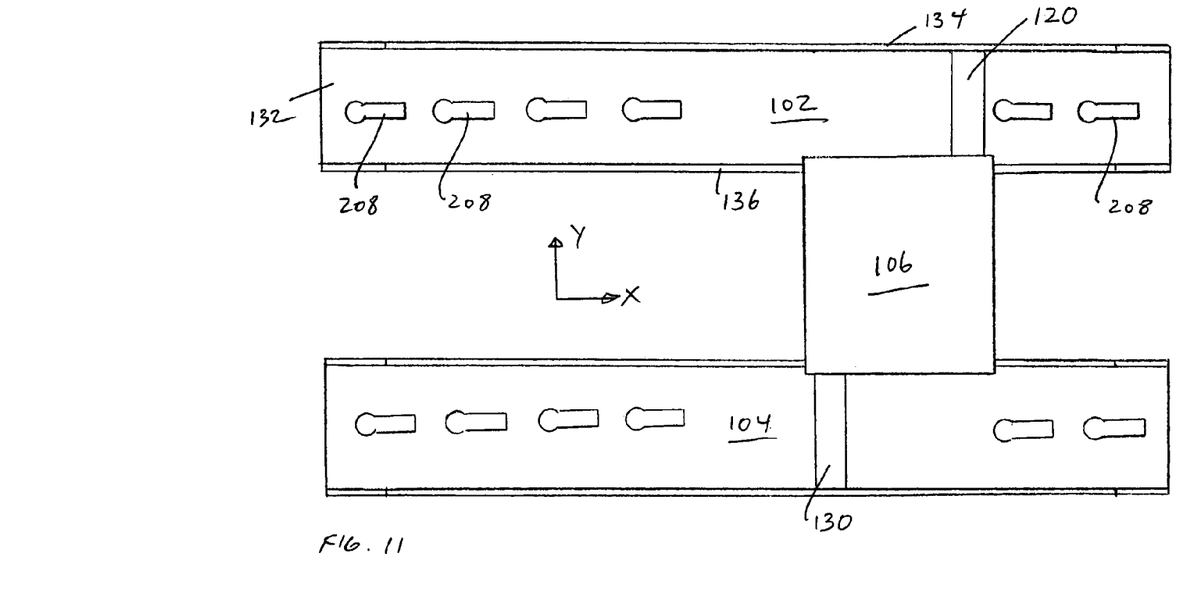
FIG. 11 shows a front view of the mount system of FIG. 8.

FIG. 11 shows the support brackets 102 and 104 along the XY coordinates. The proximal end 116 of the first arm 114 may be coupled to the two flanges 134 and 136 of the first support bracket 102 and adapted to rotate about the first pivot axis 120. The proximal end 126 of the second arm 124 may be coupled to the two flanges of the first support bracket 104 and adapted to rotate about the third pivot axis 130. The base 132 of the first bracket 102 may have a number of holes 208 adapted to receive a screw to attach the support bracket 102 to the wall 206.

Figure 12:
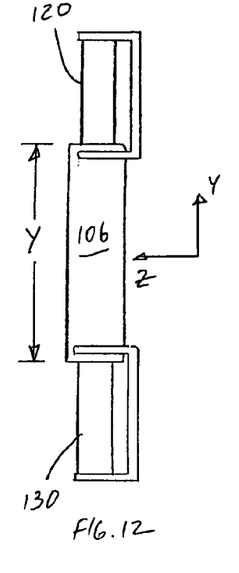
FIG. 12 shows a side view of the mount system of FIG. 8.

FIG. 12 shows the support brackets 102 and 104 along the YZ coordinates. The third support bracket 106 separates the first and second support brackets 102 and 104 by about a distance Y such that the two arms 114 and 124 may be separated by about the same distance Y as well.

Figure 13:
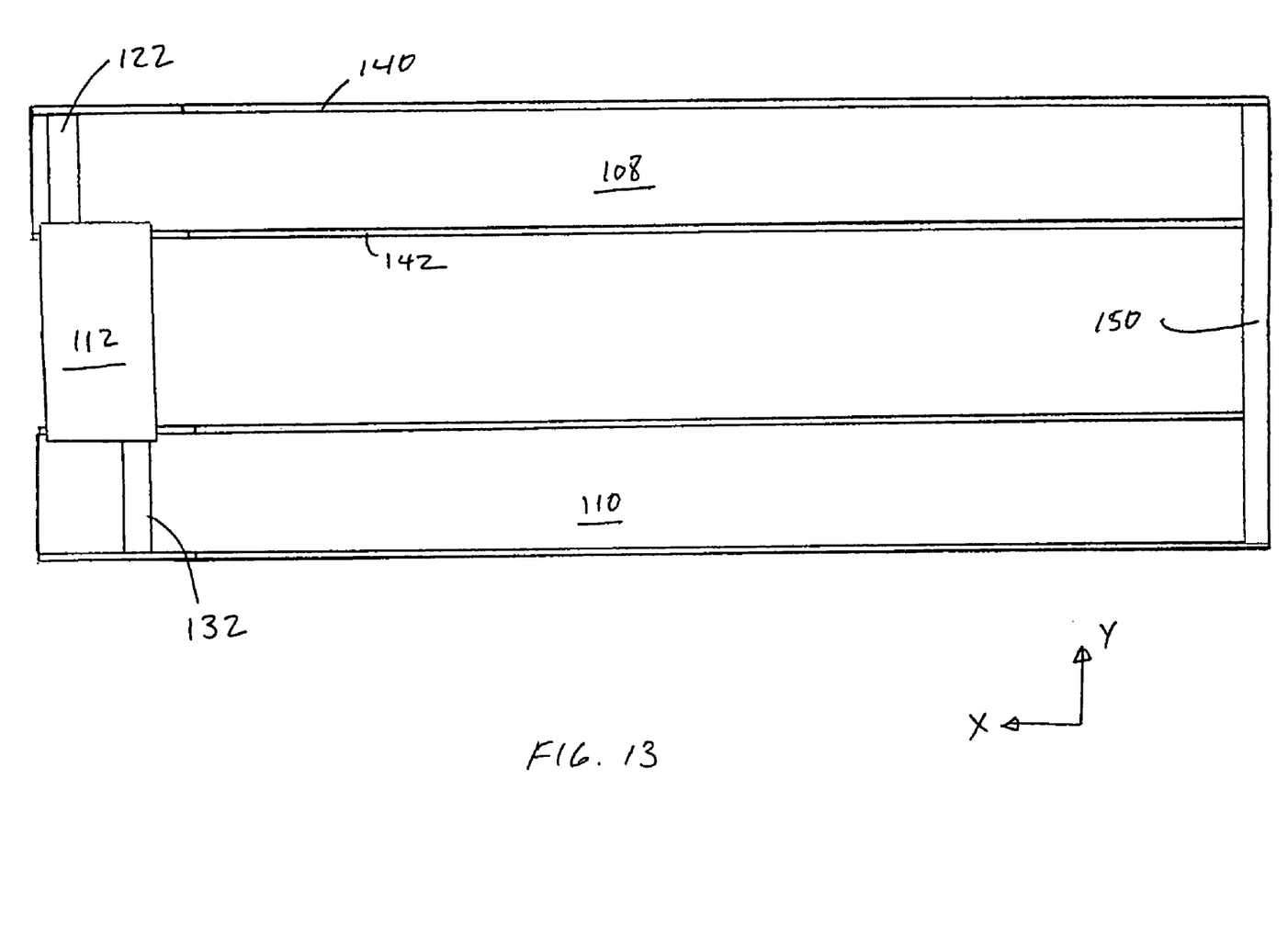
FIG. 13 shows a rear view of monitor brackets of the mount system of FIG. 8.

FIG. 13 shows the monitor brackets 108 and 110 along the XY coordinates. The distal end 118 of the first arm 114 may be coupled to the two flanges 140 and 142 of the first monitor bracket 108 and adapted to rotate about the second pivot axis 122. The distal end 128 of the second arm 124 may be coupled to the two flanges of the second monitor bracket 110 and adapted to rotate about the fourth pivot axis 132. The third monitor bracket 112 may couple the first and second monitor brackets 108 and 110 together adjacent to the third and fourth pivot axes 122 and 132. In addition, a fourth monitor bracket 150 may couple the first and second monitor brackets 108 and 110 together on the opposite end of the two monitor brackets 108 and 110.

Figure 14:
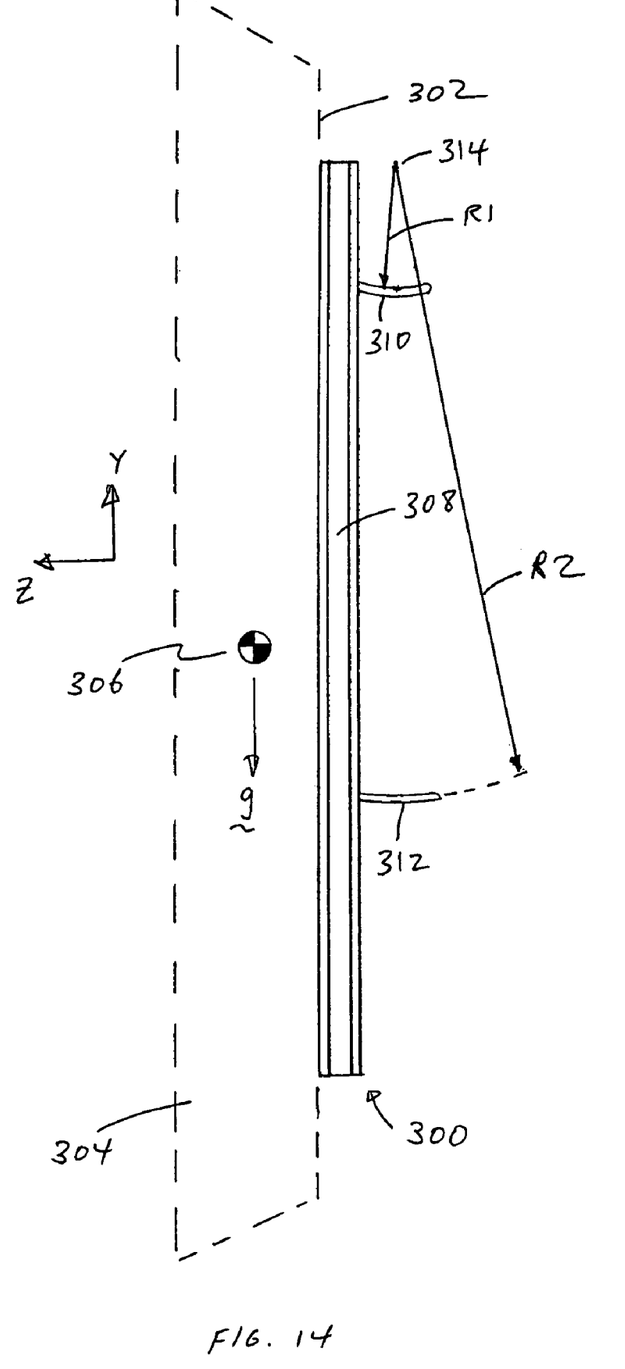
FIG. 14 shows a side view of an adapter bracket adapted to couple to the back side of a monitor.

FIG. 14 shows an adapter bracket 300 adapted to couple to the back side 302 of a monitor 304, and couple to the first and second monitor brackets 108 and 110. The weight of the monitor 304 may have a center of gravity represented as 306. The weight of the monitor 304 may cause the monitor 302 to lean forward. Moreover, in many situations, support surface such as the wall may not be perfectly upright or vertical. In such situations, there is a need to adjust for the tilt of the monitor so that the monitor 304 may be mounted in an upright position if it is desired.

Figure 15:
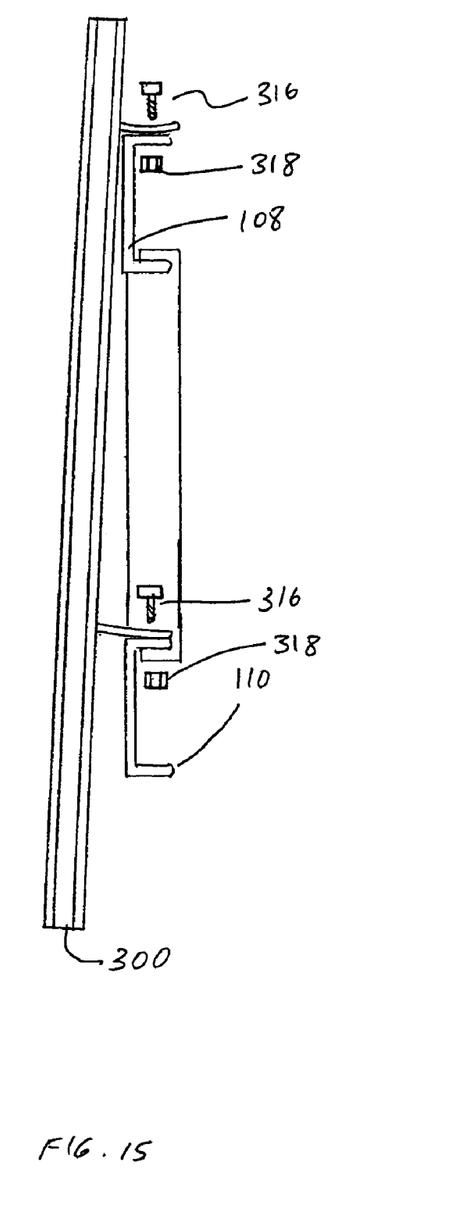
FIG. 15 shows the adapter bracket of FIG. 14 adapted to couple to the mount system of FIG. 8.

The adapter bracket 300 includes a base 308. Extending from the base 308 may be a first extension 310 and a second extension 312. The first extension 310 may be curved to have a radius of curvature R1 relative to a focal point 314; and the second extension 312 may be curved to have a radius of curvature R2 relative to the focal point 314. As shown in FIG. 15, to compensate for the monitor tilting down due to its own weight, the monitor may be coupled to the monitor brackets in a tilted upward position by tilting the monitor relative to the focal point 314. With the extensions 310 and 312 curved relative to the focal point 314, the two extensions 310 and 312 substantially maintains contact with the flanges of the two monitor brackets 108 and 110, respectively. The adapter bracket 300 may be securely attached to the monitor brackets 108 and 110 by inserting bolts 316 through the extensions and through the opening 210 of the two monitor brackets 108 and 110, and tightening each of the bolt with a nut 318.

Figure 16:
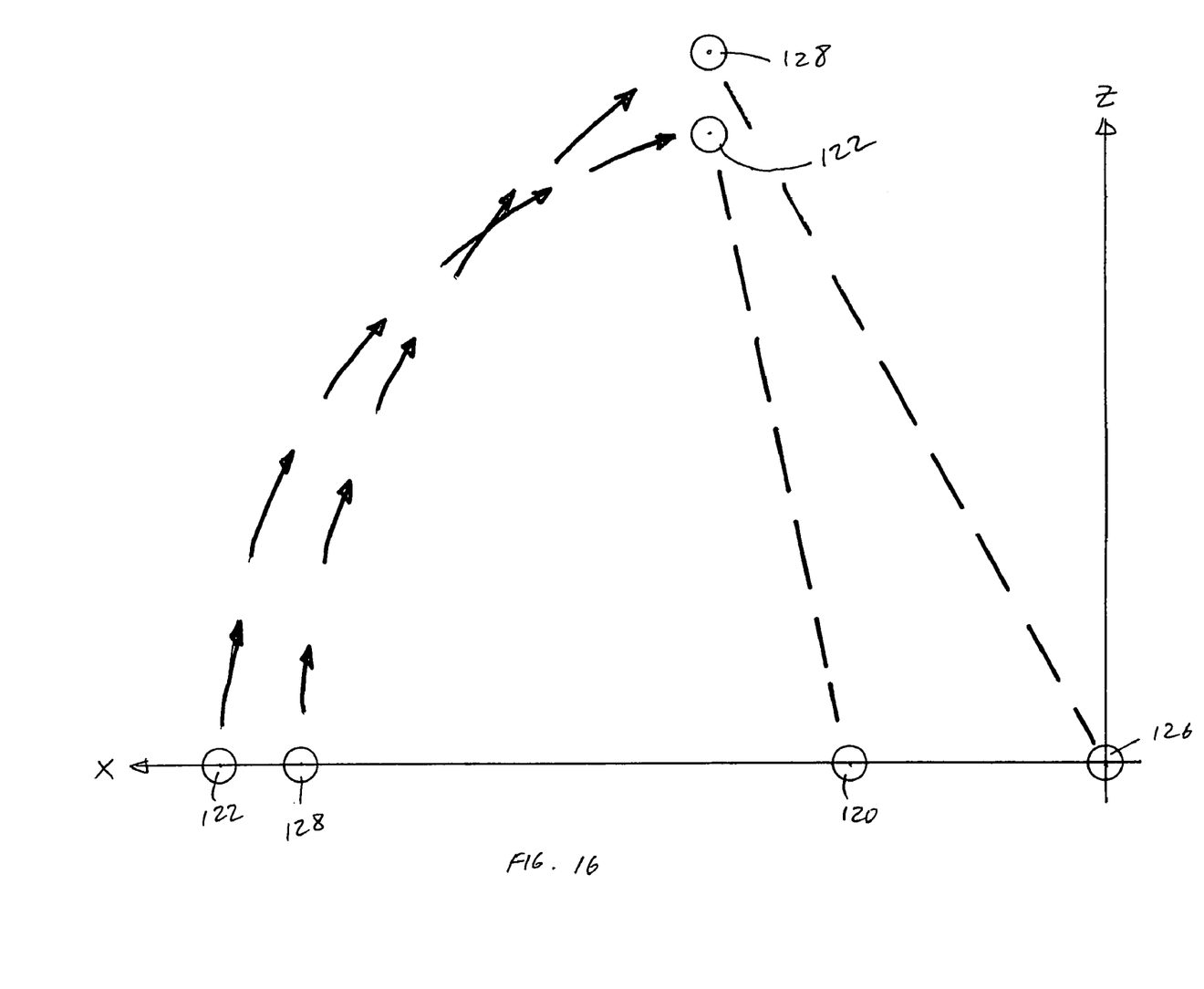
FIG. 16 shows a schematic diagram of still another mount system.

FIG. 16 shows another arrangement of the pivot axes 120-128 along the XZ plane. In this example, the four pivot axes 120-128 may be substantially along the X-axis in the retracted position to minimize the depth of the mount system 100.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A mount system adapted to swing a monitor, the mount system including:
    a support bracket adapted to couple to a supporting surface;
    a monitor bracket having a proximal end and a distal end;
    a first arm having a proximal end and a distal end, the proximal end of the first arm pivotably coupled to the support bracket about a first pivot axis, and the distal end of the first arm pivotably coupled adjacent to the proximal end of the monitor bracket about a second pivot axis;
    a second arm having a proximal end and a distal end, the proximal end of the second arm pivotably coupled to the support bracket about a third pivot axis, and the distal end of the second arm pivotably coupled adjacent to the proximal end of the monitor bracket about a fourth pivot axis, locations of the first, second, third, and fourth pivot axes defined in reference to a XZ coordinates, the monitor bracket adapted to move between a retracted position and an extended position, a distance between the first and second pivot axes being longer than a distance between the third and fourth pivot axes, the third pivot axis farther along the X-axis than the first pivot axis, and in the retracted position, the second pivot axis being farther along the X-axis than the first pivot axis, the fourth pivot axis being farther along the X-axis than the third pivot axis, and the fourth pivot axis being farther along the X-axis than the second pivot axis.

2. The mount system according to claim 1, wherein the extended position, the second pivot axis is farther along the Z-axis than the fourth pivot axis.

3. The mount system according to claim 1, where the first pivot axis is farther along the Z-axis than the third pivot axis.

4. The mount system according to claim 1, where the second pivot axis is farther along the Z-axis than the fourth pivot axis.

5. The mount system according to claim 1, where the first, second, third, and fourth pivot axes are substantially along the X-axis.

6. The mount system according to claim 1, where the fourth pivot axis is farther along the Z-axis than the third pivot axis.

7. The mount system according to claim 1, where the second pivot axis is farther along the Z-axis than the fourth pivot axis.

8. The mount system according to claim 1, including a motor mechanically coupled to one of the proximal ends of the first or second arm to move the monitor bracket between the retracted and extended positions.

9. The mount system according to claim 1, including an actuator having a proximal end and a distal end, the distal end adapted to extend and retract relative to the proximal end, the proximal end of the actuator pivotably coupled to the support bracket and the distal end of the actuator pivotably coupled to the monitor bracket to move the monitor bracket between the retracted and extended positions.

10. The mount system according to claim 1, where the proximal ends of the first and second arms are spaced apart from each other along a vertical axis when the mount system is in use.

* * * * *